United States Patent
Luo

(10) Patent No.: US 12,256,165 B2
(45) Date of Patent: Mar. 18, 2025

(54) PIXEL CIRCUIT, IMAGE SENSOR, CAMERA MODULE, AND ELECTRONIC DEVICE

(71) Applicant: VIVO MOBILE COMMUNICATION CO., LTD., Guangdong (CN)

(72) Inventor: Yi Luo, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/318,109

(22) Filed: May 16, 2023

(65) Prior Publication Data

US 2023/0292023 A1 Sep. 14, 2023

Related U.S. Application Data

(63) Continuation of application No. PCT/CN2021/140515, filed on Dec. 22, 2021.

(30) Foreign Application Priority Data

Dec. 28, 2020 (CN) .......................... 202011587897.4

(51) Int. Cl.
*H04N 25/771* (2023.01)
*H04N 25/57* (2023.01)

(52) U.S. Cl.
CPC ........... *H04N 25/771* (2023.01); *H04N 25/57* (2023.01)

(58) Field of Classification Search
CPC ...... H04N 25/771; H04N 25/57; H04N 25/53; H04N 25/77; H04N 25/779; H04N 23/55; H04N 23/57; H04N 23/54; H04N 25/59; H04N 25/76; H04N 25/585; H04N 25/78
See application file for complete search history.

(56) References Cited

U.S. PATENT DOCUMENTS

| | | | |
|---|---|---|---|
| 5,739,854 A | 4/1998 | Nishikawa | |
| 8,159,588 B2 * | 4/2012 | Boemler | H04N 25/706 348/297 |
| 10,690,755 B2 * | 6/2020 | Suzuki | G01S 17/89 |
| 11,812,173 B2 * | 11/2023 | Mori | G01S 7/4876 |
| 2011/0013066 A1 * | 1/2011 | Boemler | H04N 25/00 348/308 |
| 2011/0090385 A1 * | 4/2011 | Aoyama | H04N 25/00 348/308 |

(Continued)

FOREIGN PATENT DOCUMENTS

| | | |
|---|---|---|
| CN | 103595922 A | 2/2014 |
| CN | 104485342 A | 4/2015 |

(Continued)

OTHER PUBLICATIONS

First Office Action for Chinese Application No. 202011587897.4, dated Jan. 24, 2022, 5 Pages.

(Continued)

*Primary Examiner* — Chiawei Chen
(74) *Attorney, Agent, or Firm* — BROOKS KUSHMAN P.C.

(57) ABSTRACT

Embodiments of this application provide a pixel circuit, an image sensor, a camera module, and an electronic device, and belong to the field of image processing technologies. The pixel circuit includes: a photoelectric conversion device, a charge memory, a first transmission transistor, a second transmission transistor, and an exposure control signal memory.

12 Claims, 5 Drawing Sheets

(56) References Cited

U.S. PATENT DOCUMENTS

| | | | |
|---|---|---|---|
| 2017/0142356 A1 | 5/2017 | Deng et al. | |
| 2017/0350755 A1* | 12/2017 | Geurts | H04N 23/70 |
| 2018/0115730 A1 | 4/2018 | Velichko | |
| 2018/0156898 A1* | 6/2018 | Suzuki | G01S 17/89 |
| 2020/0154067 A1 | 5/2020 | Igarashi et al. | |
| 2021/0377478 A1* | 12/2021 | Mori | G01S 7/4863 |
| 2022/0070395 A1* | 3/2022 | Tang | H04N 25/531 |

FOREIGN PATENT DOCUMENTS

| | | |
|---|---|---|
| CN | 206977570 U | 2/2018 |
| CN | 108282626 A | 7/2018 |
| CN | 109686318 A | 4/2019 |
| CN | 110412607 A | 11/2019 |
| CN | 111885316 A | 11/2020 |
| CN | 112615995 A | 4/2021 |
| JP | 2020080521 A | 5/2020 |
| KR | 20190069557 A | 6/2019 |
| WO | 2018201219 A1 | 11/2018 |

OTHER PUBLICATIONS

International Search Report and Written Opinion for Application No. PCT/CN2021/140515, dated Feb. 24, 2022, 11 Pages.
First Office Action for Japanese Application No. 2023-534043, mailed Aug. 5, 2024, 2 Pages.
First Office Action for Korean Application No. 10-2023-7023006, dated Jan. 20, 2025, 11 Pages.

* cited by examiner

PIXEL CIRCUIT, IMAGE SENSOR, CAMERA MODULE, AND ELECTRONIC DEVICE

CROSS-REFERENCE TO RELATED APPLICATIONS

This application is a continuation of PCT International Application No. PCT/CN2021/140515 filed on Dec. 22, 2021, which claims priority to Chinese Patent Application No. 202011587897.4 filed on Dec. 28, 2020, which are incorporated herein by reference in their entireties.

TECHNICAL FIELD

This application relates to the field of image processing technologies, and specifically, to a pixel circuit, an image sensor, a camera module, and an electronic device.

BACKGROUND

In a complementary metal-oxide semiconductor image sensor (Complementary metal-oxide semiconductor, CMOS), a dynamic range generally performs gain adjustment by changing all pixel exposure times and pixel signals. In a high dynamic range (HDR) or wide dynamic range (WDR) technology, whether in a multi-frame, row interleaving, or dual-gain solution, all pixels use a same exposure time. A modulation effect of the HDR is changed by using a length of the exposure time and gain adjustment of an output signal. Because an exposure time of each pixel in the related HDR technology is the same, use of the HDR causes over-exposure or under-exposure in some pixels in some scenarios.

In a related technology, a pixel-wise (Pixel-Wise or Per-Pixel) exposure time control technology is used to perform pixel-wise independent encoding on pixels in an over-exposed area to perform exposure time control, so that pixel-level dynamic range modulation can be implemented, thereby avoiding an over-exposure or under-exposure problem. However, when the pixel-wise HDR modulation method is practiced by using an off-chip (non-chip) technology, a complex optical encoding exposure control system needs to be used. The system not only has a large volume, but also requires precise calibration between different devices, has high power consumption, and is not suitable for practicing on a mobile device such as a mobile phone. When an on-chip technology is used to practice the pixel-wise HDR modulation method, a pixel circuit needs to have two or more exposure control signal storage units to control two or more charge memories, which is not conducive to miniaturization of the pixel and degrades performance of the pixel, for example, a fill factor (Fill Factor) of the pixel. In addition, when multiple exposure control signal storage units are used, a probability exists that all output exposure control signals are the same, for example, output signals are all high-level signals, which causes a charge generated by a photoelectric conversion device to flow to multiple charge storage areas at the same time, and finally causes an encoding exposure failure.

SUMMARY

According to a first aspect, an embodiment of this application provides a pixel circuit, including:
a photoelectric conversion device, configured to respond to incident light and generate a charge according to a photoelectric effect;
a charge memory, where the charge memory is connected to the photoelectric conversion device, and the charge memory is configured to store the charge generated by the photoelectric conversion device after exposure;
a first transmission transistor, connected to the photoelectric conversion device and the charge memory, where the first transmission transistor is configured to transfer the charge to the charge memory;
a second transmission transistor, connected to the photoelectric conversion device, where the second transmission transistor is configured to transfer the charge to a preset node, so as to destroy the charge; and
an exposure control signal memory, connected to the first transmission transistor and the second transmission transistor, where the control signal memory is configured to generate a charge control signal according to an exposure control signal, so as to control conduction states of the first transmission transistor and the second transmission transistor.

According to a second aspect, an embodiment of this application provides an image sensor, including:
the pixel circuit according to the first aspect.

According to a third aspect, an embodiment of this application provides a camera module, including:
a circuit board;
the image sensor provided in the second aspect, electrically connected to the circuit board; and
a lens disposed on a side that is of the image sensor and that is away from the circuit board.

According to a fourth aspect, an embodiment of this application provides an electronic device, including:
the camera module provided in the third aspect.

Figure 1:
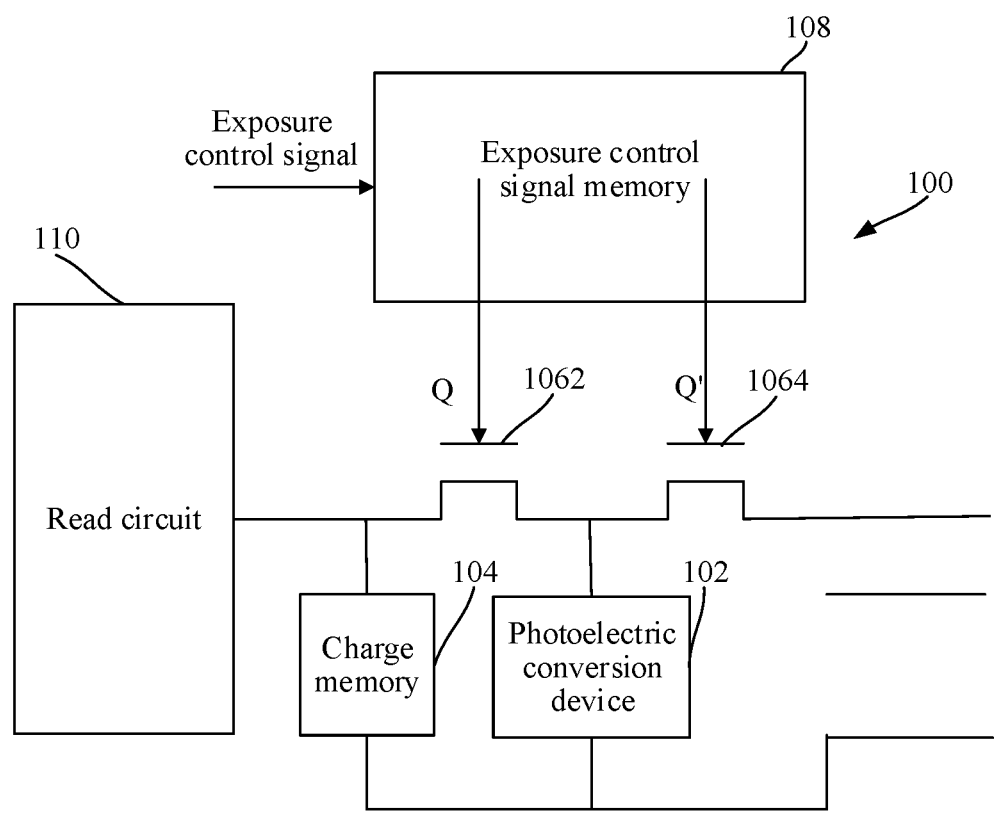
FIG. 1 is a schematic diagram 1 of a pixel circuit according to an embodiment of this application.

REFERENCE SIGNS IN THE DRAWINGS 100 pixel circuit, 102 photoelectric conversion device, 104 charge memory, 1042 first charge memory, 1044 second charge memory, 1062 first transmission transistor, 1064 second transmission transistor, 108 exposure control signal memory, 1082 signal processing device, 1084 signal receiving device, and 110 read circuit.

DETAILED DESCRIPTION

Embodiments of this application are described in detail below, and examples of the embodiments are shown in the accompanying drawings, where the same or similar reference numerals always indicate the same or similar elements or elements having the same or similar functions. The embodiments described below with reference to the accompanying drawings are exemplary and used only for explaining this application, and should not be construed as a limitation on this application. All other embodiments obtained by a person of ordinary skill in the art based on the embodiments of this application without making creative efforts shall fall within the protection scope of this application.

Features of the terms "first" and "second" in the specification and claims of this application may explicitly or implicitly include one or more of the features. In the description of this application, unless otherwise stated, "a plurality of" means two or more than two. In addition, "and/or" in this specification and the claims represents at least one of the connected objects, and the character "/" generally represents an "or" relationship between the associated objects.

In descriptions of this application, it should be understood that an orientation or positional relationship indicated by terms "upper", "lower", "front", "rear", "left", "right", and the like, is based on the orientation or positional relationship shown in accompanying drawings, and is only for ease of describing this application and simplifying the descriptions, rather than indicating or implying that an apparatus or a component referred to must have a specific orientation, be constructed and operated in a specific orientation, which therefore cannot be understood as a limitation to this application.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art can understand specific meanings of these terms in this application based on specific situations.

The following describes a pixel circuit, an image sensor, a camera module, and an electronic device provided in the embodiments of this application with reference to FIG. 1 to FIG. 5.

FIG. 1 is a schematic diagram of a pixel circuit according to an embodiment of this application. As shown in FIG. 1, a pixel circuit 100 provided in this embodiment of this application includes: a photoelectric conversion device 102, configured to respond to incident light and generate a charge according to a photoelectric effect; a charge memory 104, where the charge memory 104 is connected to the photoelectric conversion device 102, and the charge memory 104 is configured to store the charge generated by the photoelectric conversion device 102 after exposure; a first transmission transistor 1062, connected to the photoelectric conversion device 102 and the charge memory 104, where the first transmission transistor 1062 is configured to transfer the charge to the charge memory 104; a second transmission transistor 1064, connected to the photoelectric conversion device 102, where the second transmission transistor 1064 is configured to transfer the charge to a preset node, so as to destroy the charge; and an exposure control signal memory 108, connected to the first transmission transistor 1062 and the second transmission transistor 1064, where the control signal memory is configured to generate a charge control signal according to an exposure control signal, so as to control conduction states of the first transmission transistor 1062 and the second transmission transistor 1064.

In the embodiments of this application, a pixel circuit includes a photoelectric conversion device, configured to respond to incident light and generate a charge according to a photoelectric effect; a charge memory, where the charge memory is connected to the photoelectric conversion device, and the charge memory is configured to store the charge generated by the photoelectric conversion device after exposure; a first transmission transistor, connected to the photoelectric conversion device and the charge memory, where the first transmission transistor is configured to transfer the charge to the charge memory; a second transmission transistor, connected to the photoelectric conversion device, where the second transmission transistor is configured to transfer the charge to a preset node, so as to destroy the charge; and an exposure control signal memory, connected to the first transmission transistor and the second transmission transistor, where the control signal memory is configured to generate a charge control signal according to an exposure control signal, so as to control conduction states of the first transmission transistor and the second transmission transistor. Therefore, in an exposure process, only one exposure control signal memory of a binary signal (1 or 0) is required, and the first transmission transistor and the second transmission transistor are controlled by constantly changing and updating an exposure control signal of each pixel within an exposure time of one frame. When one pixel is commanded to require exposure, a generated charge flows to the charge memory. When one pixel is commanded not to be exposed, the generated charge flows to a preset node and is destroyed, so that an effective exposure time of each pixel can be orchestrated by a pre-written exposure control signal, and a pixel-wise HDR modulation function of the image sensor is implemented. On the one hand, there is no need to use a complex optical encoding exposure control system, which avoids the size and power consumption problems when the off-chip technology practices the pixel-wise HDR modulation method. On the other hand, when the pixel-wise HDR modulation method is practiced in the on-chip technology, a quantity of exposure control signal memories used to receive and analyze an exposure control signal is reduced. While the structure of the pixel circuit is simplified, the size of the pixel is effectively reduced, which is beneficial to miniaturization of the pixel, and performance of the pixel is improved. In addition, a charge flow disorder caused by a same exposure control signal of multiple exposure control signal memories is avoided, and stability and a gain effect of the pixel-wise HDR modulation are ensured.

Optionally, an architecture of the pixel circuit 100 includes one exposure control signal memory 108 (unit), one photoelectric conversion device 102, photoelectric conversion areas of the first transmission transistor 1062 and the second transmission transistor 1064, and the charge memory 104. In an exposure process, a binary exposure control signal (1 or 0) enters the exposure control signal memory 108 and generates charge control signals Q and Q', where Q' is opposite to Q, that is, $Q'=Q \times (-1)$, so as to respectively control the conduction states of the first transmission transistor 1062 and the second transmission transistor 1064, so that a part of charge generated during exposure in the photoelectric conversion area can flow into the corresponding charge memory 104 through the first transmission transistor 1062 according to the exposure control signal, thereby implementing effective exposure of a pixel. After exposure ends, the charge in the charge memory 104 can be read by a read circuit 110 to output an image, and another part of charge flows into the preset node through the second transmission transistor 1064, so as to destroy this part of charge. Therefore, effective exposure duration of each pixel can be changed by updating the exposure control signal, that is, only charges generated and stored when those pixels are commanded to be exposed are read, so as to implement a pixel-wise HDR modulation function of the image sensor.

In this embodiment, the pixel-wise HDR modulation function of the image sensor can be implemented without using a complex optical encoding exposure control system, thereby avoiding size and power consumption problems when the off-chip technology practices the pixel-wise HDR modulation method. In addition, a quantity of exposure control signal memories 108 used to receive and analyze an exposure control signal is reduced. While the structure of the pixel circuit 100 is simplified, the size of the pixel is effectively reduced, which is beneficial to miniaturization of the pixel, and performance of the pixel is improved. In addition, a charge flow disorder caused by a same exposure control signal of multiple exposure control signal memories 108 is avoided, and stability and a gain effect of the pixel-wise HDR modulation are ensured.

The preset node may be a memory, and an internal charge is deleted by resetting the memory. The preset node may alternatively be a voltage source, and directly receives a charge.

Figure 2:
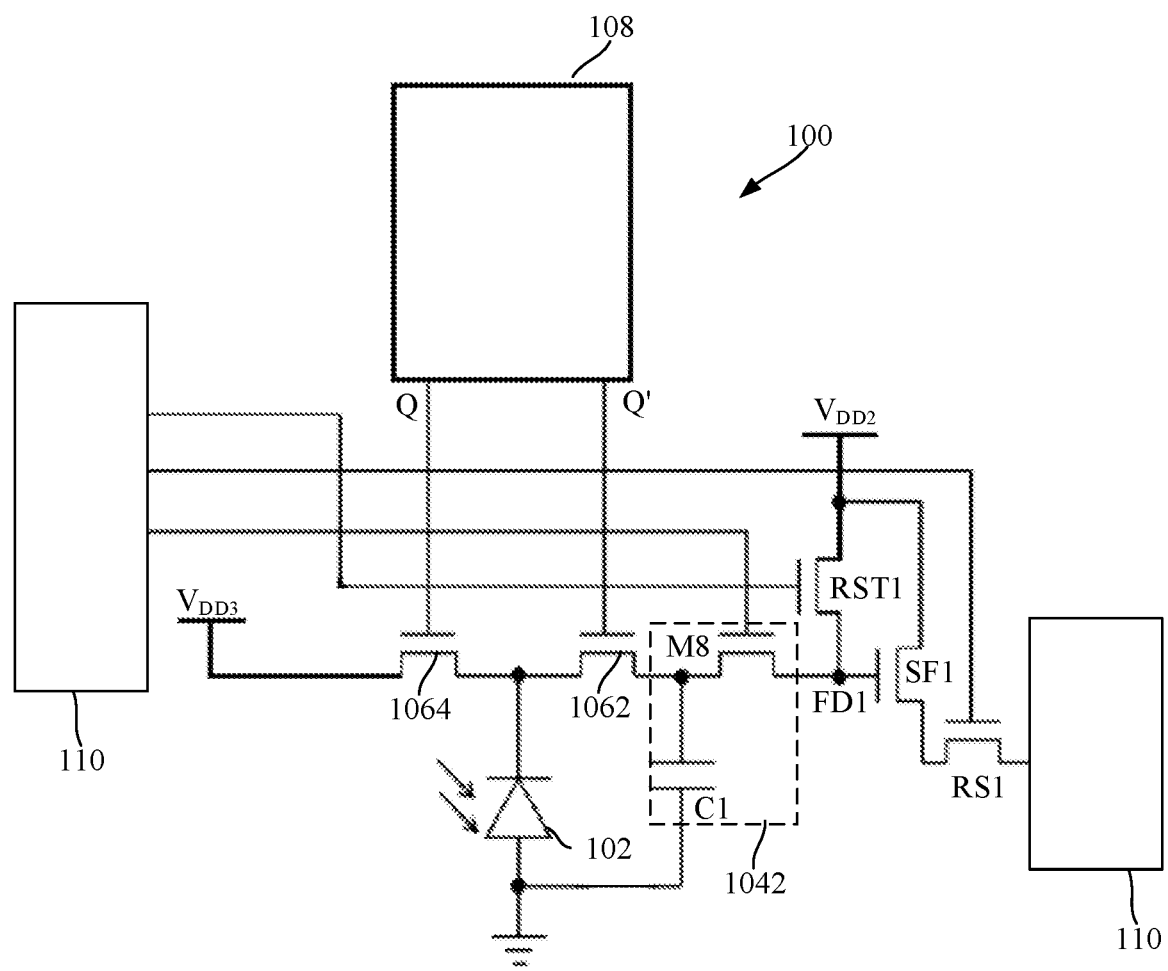
FIG. 2 is a schematic diagram 2 of a pixel circuit according to another embodiment of this application.

For example, FIG. 2 is a schematic diagram of a pixel circuit according to another embodiment of this application. As shown in FIG. 2, a preset node is a voltage source $V_{DD3}$. The pixel circuit 100 is provided with a charge memory C1. When the first transmission transistor 1062 is disconnected and the second transmission transistor 1064 is closed, a charge generated by the photoelectric conversion device 102 directly flows to the voltage source $V_{DD3}$ for destruction. Therefore, a case in which when two charge memories are disposed, one of the two charge memories stores a charge and then destroys the charge is avoided, which further simplifies the pixel circuit. In a specific application, the photoelectric conversion device 102 is a photodiode, and the transistor is capable of controlling an output current based on an input voltage, including a bipolar transistor (BJT) and a field effect transistor (FET), where the field effect transistor may be a metal oxide semiconductor field effect transistor (MOSFET). The charge memory 104 may be a capacitive charge memory, or may be another type of charge memory, for example, an operational transconductance amplifier.

It should be noted that, in an exposure time of one pixel frame, an exposure control signal is obtained by means of analysis according to an over-exposure or under-exposure situation of a pixel in an image within the exposure time, and each pixel may receive one or more binary exposure control signals. Sequences of these exposure control signals may be a same signal, for example, all are is (high level) or all are 0s (low level), or may be different signals, for example, 100101100 . . . .

In addition, on an image sensor, exposure control signal sequences received by each pixel in an exposure time of one pixel frame may be the same or may be different. Similarly, effective exposure times of each pixel in each pixel frame may be different or may be the same, and effective exposure may be continuous or may be intermittent.

Further, the first transmission transistor 1062 and the second transmission transistor 1064 are alternately turned on, that is, the first transmission transistor 1062 and the second transmission transistor 1064 are not turned on at the same time, so as to prevent a charge from flowing to multiple charge memories 104 at the same time, and finally fail to perform encoding exposure.

For example, if sequences of exposure control signals of one pixel are all 1s, and output charge control signals are Q=1 and Q'=0, in an exposure time of one pixel frame, the first transmission transistor 1062 is closed and powered on, and the second transmission transistor 1064 is opened and powered off. If sequences of exposure control signals of one pixel are 1001, output first charge control signals are Q=1 and Q'=0, the second charge control signal and the third charge control signal are Q=0 and Q'=1, and the fourth charge control signal is Q=1 and Q'=0, the first transmission transistor 1062 is closed and turned on, and the second transmission transistor 1064 is opened and turned off for preset duration, and then the first transmission transistor 1062 is opened and turned off, and the second transmission transistor 1064 is closed and turned on for two preset duration, and finally the first transmission transistor 1062 is closed and turned on, and the second transmission transistor 1064 is opened and turned off for the preset duration. When the first transmission transistor 1062 is turned on, the charge generated by the photoelectric conversion device 102 during exposure is transferred to the charge memory 104 for storage, and when the second transmission transistor 1064 is turned on, the charge generated by the photoelectric conversion device 102 during exposure is transferred to the preset node, so as to destroy the charge. Therefore, effective exposure duration of each pixel is independently modulated, and when HDR modulation at a pixel level is implemented, a sudden feeling of an area edge of an output image is avoided. This not only compensates for over-exposure or under-exposure, but also simplifies the pixel architecture and can effectively reduce the size of the pixel.

In an embodiment of this application, further, the exposure control signal memory 108 is a unit bit static random access memory or a unit bit dynamic random access memory.

In this embodiment, the static random access memory (SRAM) is a storage device that has a static access function, and can store data stored in the static random access memory without refreshing the circuit, which can increase a read/write speed and reduce power consumption. In addition, a static random access memory process can be widely applied to cache modules of various processor chips, thereby reducing manufacturing difficulty. The dynamic random access memory (DRAM) has a feature of a large storage capacity and a low cost, and a circuit structure of the dynamic random access memory is simpler than that of the static random access memory, so that a pixel size can be further reduced. Likewise, a dynamic random access memory process can be widely applied to a mainstream memory chip, so that manufacturing is facilitated.

In addition, both the unit bit SRAM and the unit bit DRAM use an information amount of one bit, so that the exposure control signal memory 108 stores only 1-bit binary signal in sequence even if multiple exposure control signals are received. It is avoided that different charge control signals are generated at the same time, the charge generated by the photoelectric conversion device 102 is prevented from flowing to different devices at the same time, finally failing encoding exposure. Therefore, pixel-wise HDR modulation can be implemented by using only one exposure control signal memory 108, which not only simplifies the pixel architecture, but also ensures stability and a gain effect of pixel-wise HDR modulation.

Figure 3:
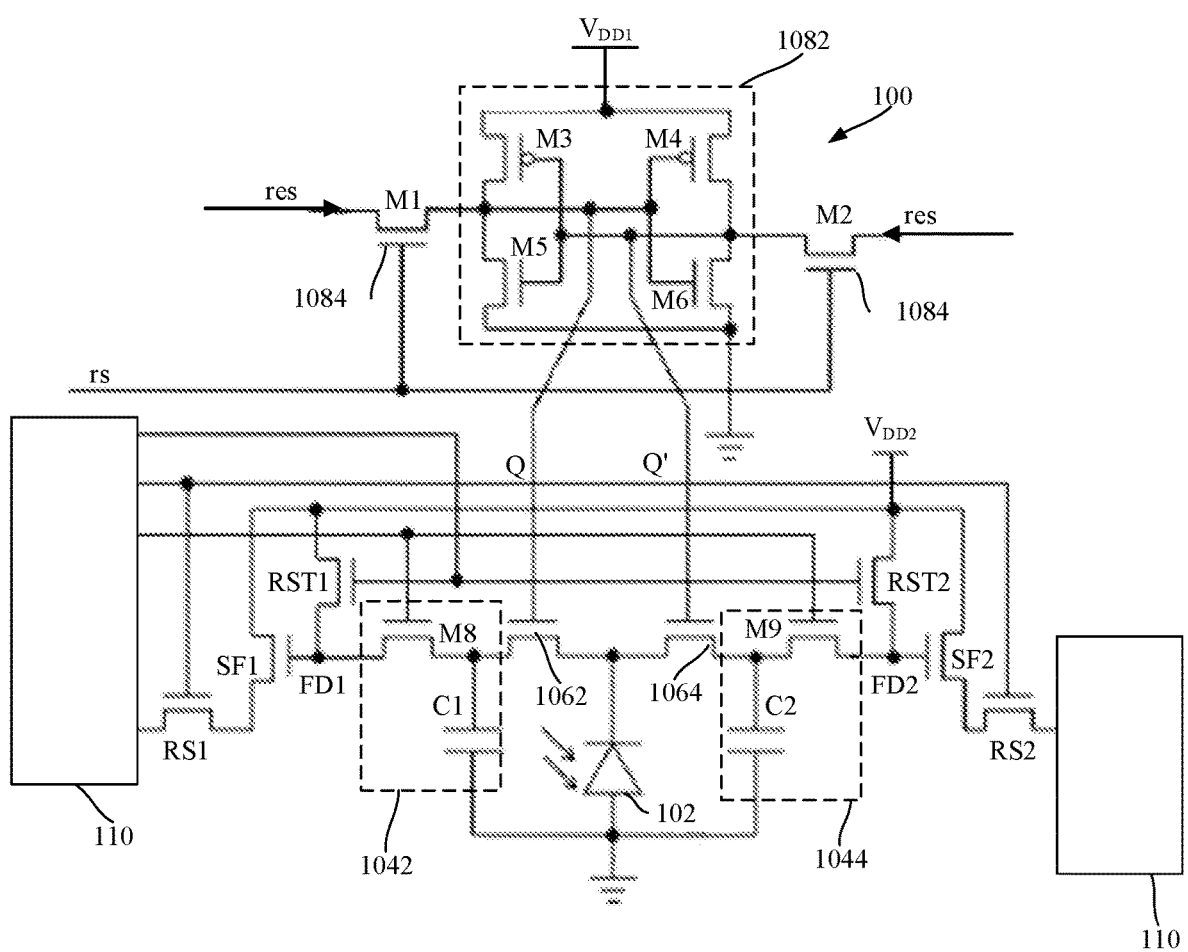
FIG. 3 is a schematic diagram 3 of a pixel circuit according to still another embodiment of this application.

FIG. 3 is a schematic diagram of a pixel circuit according to still another embodiment of this application. As shown in FIG. 3, a unit bit static random access memory includes: a signal receiving device 1084, configured to receive the exposure control signal according to a control instruction of a control terminal of the unit bit static random access memory; and a signal processing device 1082, connected to the signal receiving device 1084, where the signal processing device 1082 is configured to generate the charge control signal according to the exposure control signal;

Optionally, the signal receiving device 1084 includes: a first transistor M1 and a second transistor M2, drains of the first transistor M1 and the second transistor M2 are connected to an output terminal of the exposure control signal, and gates of the first transistor M1 and the second transistor M2 are connected to the control terminal of the unit bit static random access memory; and the signal processing device 1082 includes: a third transistor M3, a fourth transistor M4, a fifth transistor M5, and a sixth transistor M6, where sources of the third transistor M3 and the fourth transistor M4 are connected to a first voltage source VDD1 of the pixel circuit 100, a gate of the third transistor M3 is separately connected to a gate of the fifth transistor M5, a drain of the fourth transistor M4, a drain of the sixth transistor M6, a source of the first transistor M1, and the first transmission transistor 1062, a gate of the fourth transistor M4 is separately connected to a gate of the sixth transistor M6, a drain of the third transistor M3, a drain of the fifth transistor M5, a source of the second transistor M2, and the second transmission transistor 1064, and sources of the fifth transistor M5 and the sixth transistor M6 are grounded.

In this embodiment, the control terminal of the unit bit static random access memory can output a receive control instruction rs, so as to control the conduction states of the first transistor M1 and the second transistor M2 and further control the signal receiving device 1084 to receive the exposure control signal res. The first transistor M1 and the second transistor M2 are respectively configured to receive the opposite exposure control signal res, that is, the exposure control signal res received by the second transistor M2 is an inverted signal of the exposure control signal res received by the first transistor M1. Each bit is stored in two cross-coupled inverters formed by the third transistor M3, the fourth transistor M4, the fifth transistor M5, and the sixth transistor M6, that is, an output of the first inverter is connected to an input of the second inverter, an output of the second inverter is connected to an input of the first inverter, and outputs of the two inverters are completed, that is, one bit is stored.

In a specific application, the first voltage source VDD1 may be a variable voltage source.

Figure 4:
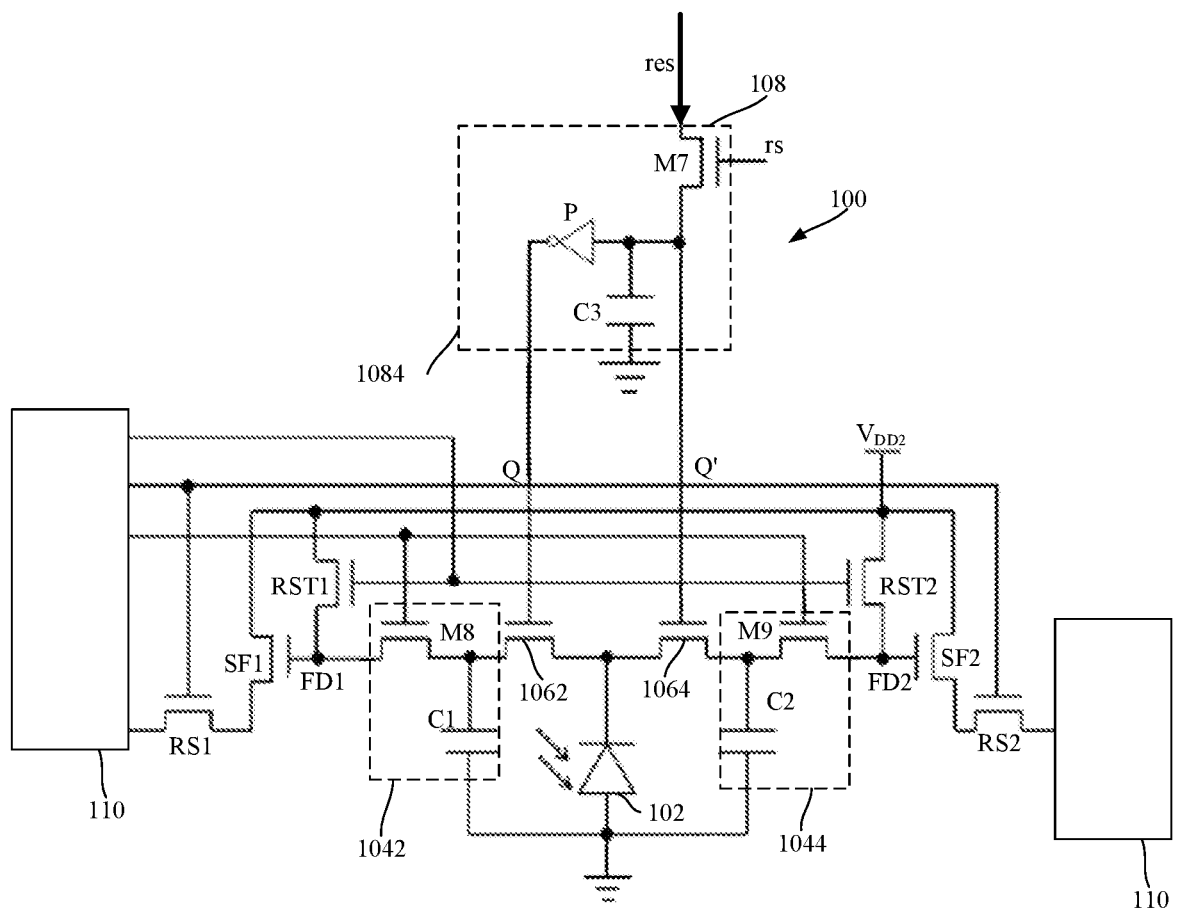
FIG. 4 is a schematic diagram 4 of a pixel circuit according to still another embodiment of this application.

FIG. 4 is a schematic diagram of a pixel circuit according to still another embodiment of this application. As shown in FIG. 4, the unit bit dynamic random access memory includes: a seventh transistor M7, where a drain of the seventh transistor M7 is connected to the output terminal of the exposure control signal, a gate of the seventh transistor M7 is connected to a control terminal of the unit bit dynamic random access memory, and the seventh transistor M7 is configured to receive the exposure control signal res according to a control instruction rs of the control terminal; a first capacitor C3, where a first terminal of the first capacitor C3 is separately connected to a source of the seventh transistor M7 and the first transmission transistor 1062, and a second terminal of the first capacitor C3 is grounded; and an inverter P, where a first terminal of the inverter P is connected to a first terminal of the first capacitor C3, a second terminal of the inverter P is connected to the second transmission transistor 1064, and a phase of an input signal is inverted by 180 degrees by using the inverter P.

In this embodiment, within an exposure time of one pixel frame, the exposure control signal res reaches the first capacitor C3 by using the seventh transistor M7, and is directly used as a charge control signal Q of the first transmission transistor 1062. At the same time, the charge control signal Q generates a charge control signal Q' of the second transmission transistor 1064 through the inverter P (not gate).

It should be noted that, because of a semiconductor characteristic, the first capacitor of the DRAM has an unavoidable current leakage effect. To keep the exposure control signal continuously and effectively stored in the exposure control signal memory of the DRAM, the exposure control signal memory of the DRAM needs to perform timing signal refresh.

In a specific application, the first capacitor C3 may be a parasitic capacitor, a Poly capacitor, a MIM (metal isolator metal) capacitor, a MOM (metal oxide metal) capacitor, or a MOS (metal oxide semiconductor) capacitor of a node.

As shown in FIG. 1, in an embodiment of this application, further, the pixel circuit 100 further includes: the read circuit 110, connected to the charge memory 104, where the read circuit 110 is configured to read the charge in the charge memory 104 and output an exposure image.

In this embodiment, after exposure ends, the read circuit 110 may read the charge in the modulated charge memory 104 by using a column data line, and output an exposed image.

As shown in FIG. 3 and FIG. 4, in an embodiment of this application, further, the charge memory includes: a first charge memory 1042, connected to the first transmission transistor 1062, where the first charge memory 1042 is configured to output the charge according to a read instruction of the read circuit 110; and a second charge memory 1044, connected to the second transmission transistor 1064, where the second charge memory 1044 is configured to reset according to the read instruction of the read circuit 110.

In this embodiment, there are one or more charge memories, and multiple charge memories include the first charge memory 1042 and the second charge memory 1044. The first charge memory 1042 is connected to the first transmission transistor 1062. When a pixel is commanded to be exposed, the charge may be stored in the first charge memory 1042 by using the first transmission transistor 1062. After exposure ends, the read circuit 110 may read the charge in the first charge memory 1042 and generate the exposure image. The second charge memory 1044 is connected to the second transmission transistor 1064. When one pixel is commanded not to be exposed, the charge may be stored in the second charge memory 1044 by using the second transmission transistor 1064, and the read circuit 110 may discard the charge after reading the charge in the second charge memory 1044. In addition, the second charge memory 1044 performs reset, deletes a stored charge, and ensures that there is sufficient space to store a charge generated in next exposure, or does not read the charge in the second charge memory 1044, and directly resets the second charge memory 1044. Therefore, two types of pixel output signals are output by using the first charge memory 1042 and the second charge memory 1044, and only one of the two signals is used to output an image, and the other one is finally ignored and reset is performed. In addition, because a charge that needs to be destroyed is first stored in the second charge memory 1044, the processor can read a pixel output signal generated by the charge that needs to be destroyed, so as to analyze image HDR modulation.

It should be noted that, if a quantity of charge memories is N, and N is a multiple of 2, a quantity of exposure control signal memories 108 is N/2, so as to ensure that each exposure control signal memory 108 can control two charge memories.

As shown in FIG. 3 and FIG. 4, in an embodiment of this application, further, the first charge memory 1042 or the second charge memory 1044 includes: a second capacitor (a capacitor C1 and a capacitor C2) connected to the photoelectric conversion device 102; and a storage transistor (transistors M8 and M9) connected to the second capacitor and the read circuit 110, where the storage transistor is configured to transfer a charge in the second capacitor to the read circuit 110.

In this embodiment, the charge generated by the photoelectric conversion device 102 during exposure may separately flow into a corresponding second capacitor through the first transmission transistor 1062 and the second transmission transistor 1064 that are in a closed and energized state. After exposure ends, in a signal reading phase of the pixel, the charge in the second capacitor is read by the read circuit 110 by using a corresponding storage transistor.

For example, after exposure ends, the charge in the second capacitor C1 reaches a floating diffusion node FD1 by using the closed and energized storage transistor M8, and is read by the read circuit 110, so as to output an exposure image. The charge in the second capacitor C2 reaches a floating diffusion node FD2 through the closed and energized memory transistor M9 and is read by the read circuit 110 to ignore and reset.

As shown in FIG. 2 to FIG. 4, in an embodiment of this application, further, the pixel circuit 100 further includes: a floating diffusion node (FD1 and FD2) between the memory transistor (transistors M8 and M9) and the read circuit 110; a reset transistor (RST1 and RST2) connected between a second voltage source VDD2 and the floating diffusion node, where the reset transistor (RST1 and RST2) is configured to reset a voltage of the floating diffusion node according to a reset control signal; a source follower transistor (SF1 and SF2), where a gate of the source follower transistor is connected to the floating diffusion node, and a drain of the source follower transistor is connected to the second voltage source VDD2, and a row selection transistor (RS1 and RS2), where a drain of the row selection transistor is connected to a source of a source follower transistor, and a source and a gate of the row selection transistor are connected to the read circuit 110.

In this embodiment, whether the floating diffusion node is coupled to the second capacitor in the charge memory 104 during a charge accumulation cycle to receive the charge stored in the second capacitor or coupled to the second voltage source VDD2 during a reset cycle to reset the voltage of the floating diffusion node is determined by using conduction states of the reset transistor and the memory transistor in the charge memory 104. A voltage signal of the floating diffusion node is amplified and output to the column data line through the source follower transistor and the row selection transistor.

For example, as shown in FIG. 3 and FIG. 4, in a reading phase, the row selection transistors RS1 and RS2 are closed and powered on, the reset transistors RST1 and RST2 are turned on, and the floating diffusion nodes FD1 and FD2 are reset to the voltage of the second voltage source VDD2, ensuring that charges stored in the second capacitors C1 and C2 are respectively transferred to the floating diffusion nodes FD1 and FD2, and the charges are read by using SF1, RS1, SF2, and RS2.

In an embodiment of this application, an image sensor is provided, including the pixel circuit provided in any one of the foregoing embodiments. Therefore, the image sensor also includes all beneficial effects of the pixel circuit in any one of the foregoing embodiments, and details are not described herein again.

Further, the image sensor is a complementary metal oxide semiconductor image sensor (CMOS Image Sensor, CIS) with a high dynamic range (HDR) mode. The CMOS image sensor has advantages such as simple process, easy integration with other devices, small size, light weight, low power consumption, and low cost, and can be widely applied to different electronic devices, for example, a digital camera, a camera phone, a digital camera, a medical camera device (gastroscope), and a vehicle-mounted camera device.

In an embodiment of this application, a camera module is provided, including: a circuit board; the image sensor provided in the foregoing embodiment electrically connected to the circuit board; and a lens disposed on a side that is of the image sensor and that is away from the circuit board. Therefore, the camera module also includes all beneficial effects of the image sensor in any one of the foregoing embodiments, and details are not described herein again.

In an embodiment of this application, an electronic device is provided, including: the camera module provided in the foregoing embodiment. Therefore, the electronic device also includes all beneficial effects of the camera module in the foregoing embodiment, and details are not described herein again.

The electronic device in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA). The non-mobile electronic device may be a server, a network attached storage (NSA), a personal computer (PC), a television (TV), a teller machine, or an automated machine. This is not specifically limited in this embodiment of this application.

The electronic device in this embodiment of this application may be an apparatus having an operating system. The operating system may be an Android operating system, may be an iOS operating system, or may be another possible operating system. This is not specifically limited in this embodiment of this application.

Figure 5:
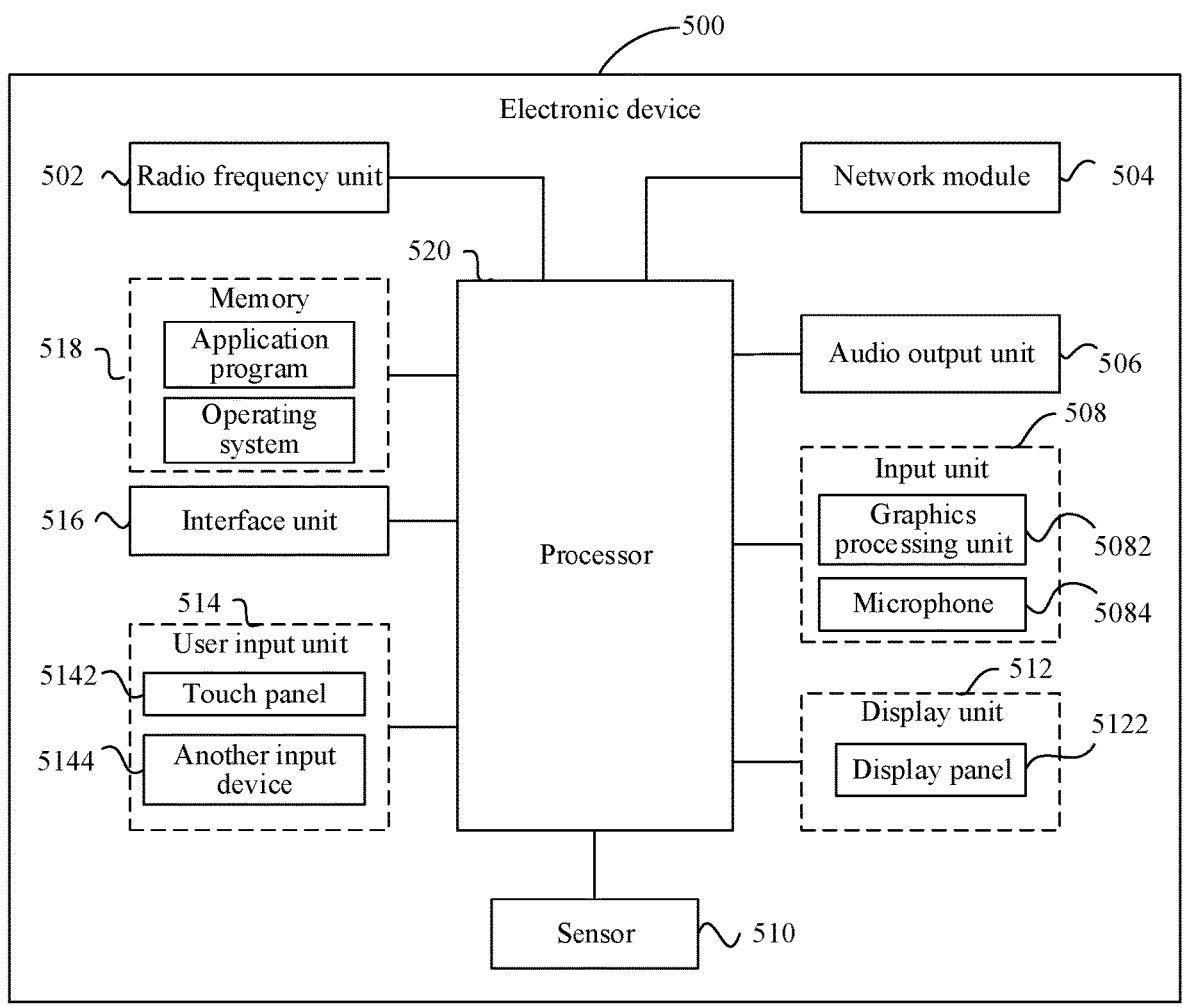
FIG. 5 is a hardware structural block diagram of an electronic device according to an embodiment of this application.

FIG. 5 is a hardware structural block diagram of an electronic device according to an embodiment of this application. As shown in FIG. 5, the electronic device 500 includes but is not limited to: a radio frequency unit 502, a network module 504, an audio output unit 506, an input unit 508, a sensor 510, a display unit 512, a user input unit 514, an interface unit 516, a memory 518, and a processor 520.

A person skilled in the art may understand that the electronic device 500 may further include a power supply (for example, a battery) that supplies power to each component. The power supply may be logically connected to the processor 520 by using a power management system, to manage functions such as charging, discharging, and power consumption by using the power management system. The structure of the electronic device shown in FIG. 5 constitutes no limitation on the electronic device, and the electronic device may include more or fewer components than those shown in the figure, or combine some components, or have different component arrangements. The electronic device in this embodiment of this application includes, but is not limited to, a mobile phone, a tablet computer, a notebook computer, a palmtop computer, an in-vehicle electronic device, a wearable device, a pedometer, and the like.

It should be understood that, in this embodiment of this application, the radio frequency unit 502 may be configured to receive and send information or a signal in a call process; specifically, receive downlink data from a base station or send uplink data to the base station. The radio frequency unit 502 includes, but is not limited to, an antenna, at least one amplifier, a transceiver, a coupler, a low noise amplifier, a duplexer, and the like.

The network module 504 provides wireless broadband Internet access for a user, for example, helps the user to receive and send an email, browse a webpage, and access stream media, and the like.

The audio output unit 506 can convert audio data received by the radio frequency unit 502 or the network module 504 or audio data stored in the memory 518 into an audio signal and output the audio signal as sound. Moreover, the audio output unit 506 may further provide an audio output (such as call signal receiving sound or message receiving sound) related to a specific function executed by the electronic device 500. The audio output unit 506 includes a speaker, a buzzer, a receiver, and the like.

The input unit 508 is configured to receive audio or video signals. The input unit 508 may include a graphics processing unit (GPU) 5082 and a microphone 5084. The graphics processing unit 5082 processes image data of a still picture or a video obtained by an image capture apparatus (such as a camera) in a video capture mode or an image capture mode. A processed image frame may be displayed on the display unit 512, stored in the memory 518 (or another storage medium), or sent by using the radio frequency unit 502 or the network module 504. The microphone 5084 may receive a sound, and can process the sound as audio data. The processed audio data may be converted into a format that can be sent to a mobile communication base station by using the radio frequency unit 502 for output in a case of a telephone call mode.

The electronic device 500 further includes at least one sensor 510, such as a fingerprint sensor, a pressure sensor, an iris sensor, a molecular sensor, a gyroscope, a barometer, a hygrometer, a thermometer, an infrared sensor, a light sensor, a motion sensor, and another sensor.

The display unit 512 is configured to display information inputted by a user or information provided to the user. The display unit 512 may include a display panel 5122. The display panel 5122 may be configured in a form such as a liquid crystal display or an organic light-emitting diode.

The user input unit 514 may be configured to receive input digit or character information and generate key signal input related to user settings and function control of the electronic device. Optionally, the user input unit 514 may include a touch panel 5142 and another input device 5144. The touch panel 5142 is also referred to as a touchscreen, and may collect a touch operation of a user on or near the touch panel 5142. The touch panel 5142 may include two parts: a touch detection apparatus and a touch controller. The touch detection apparatus detects a touch direction and position of the user, detects a signal generated by a touch operation, and transmits the signal to the touch controller. The touch controller receives touch information from the touch detection apparatus, converts the touch information into point coordinates, and sends the point coordinates to the processor 520; and can receive and execute a command sent by the processor 520. The another input device 5144 may include but is not limited to a physical keyboard, a function key (such as a volume control key or an on/off key), a trackball, a mouse, and a joystick. Details are not described herein.

Further, the touch panel 5142 can cover display panel 5122. When detecting a touch operation on or near the touch panel 5142, the touch panel 5142 transmits the touch operation to the processor 520 to determine a type of a touch event. Then, the processor 520 provides corresponding visual output on the display panel 5122 based on the type of the touch event. The touch panel 5142 and the display panel 5122 may be used as two independent components, or may be integrated into one component.

The interface unit 516 is an interface for connection between an external apparatus and the electronic device 500. For example, the external apparatus may include a wired or wireless headset port, an external power supply (or battery charger) port, a wired or wireless data port, a storage card port, a port configured to connect an apparatus having an identification module, an audio input/output (I/O) port, a video I/O port, an earphone port, and the like. The interface unit 516 may be configured to receive an input (such as data information or electric power) from an external apparatus and transmit the received input to one or more elements in the electronic device 500 or may be configured to transmit data between the electronic device 500 and an external apparatus.

The memory 518 may be configured to store an application program and various data. The memory 518 may mainly include a program storage area and a data storage area. The program storage area may store an operating system, an application program required by at least one function (for example, a sound playback function and an image display function), and the like. The data storage area may store data (such as audio data and an address book) created according to use of the mobile terminal. In addition, the memory 518 may include a high-speed random access memory, and may further include a non-volatile memory, for example, at least one magnetic disk storage device, a flash memory device, or another volatile solid-state storage device.

The processor 520 executes various functions and processes data of the electronic device 500 by running or executing an application program and/or a module stored in the memory 518 and invoking data stored in the memory 518, so as to perform overall monitoring on the electronic device 500. The processor 520 may include one or more processing units. The processor 520 may integrate an application processor and a modem processor, where the application processor mainly processes an operating system, a user interface, an application program, and the like, and the modem processor mainly processes an image processing operation.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of this application. In this specification, exemplary descriptions of the foregoing terms do not necessarily refer to the same embodiment or example. In addition, the described specific features, structures, materials, or characteristics may be combined in a proper manner in any one or more of the embodiments or examples.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

The foregoing descriptions are merely preferred embodiments of this application, and are not intended to limit this application. For a person skilled in the art, various modifications and changes may be made in this application. Any modification, equivalent replacement, or improvement made without departing from the spirit and principle of this application shall fall within the protection scope of this application.

What is claimed is:

1. A pixel circuit, comprising:
   a photoelectric conversion device, configured to respond to incident light and generate a charge according to a photoelectric effect;
   a charge memory, wherein the charge memory is connected to the photoelectric conversion device, and the charge memory is configured to store the charge generated by the photoelectric conversion device;
   a first transmission transistor, connected to the photoelectric conversion device and the charge memory, wherein the first transmission transistor is configured to transfer the charge to the charge memory;
   a second transmission transistor, connected to the photoelectric conversion device, wherein the second transmission transistor is configured to transfer the charge to a preset node, so as to destroy the charge; and
   an exposure control signal memory, connected to the first transmission transistor and the second transmission transistor, wherein the control signal memory is configured to generate a charge control signal according to an exposure control signal, so as to control conduction states of the first transmission transistor and the second transmission transistor.

2. The pixel circuit according to claim 1, wherein the exposure control signal memory is a unit bit static random access memory or a unit bit dynamic random access memory.

3. The pixel circuit according to claim 1, wherein the unit bit static random access memory comprises:
   a signal receiving device, configured to receive the exposure control signal according to a control instruction of a control terminal of the unit bit static random access memory; and
   a signal processing device, connected to the signal receiving device, wherein the signal processing device is configured to generate the charge control signal according to the exposure control signal;
   the signal receiving device comprises: a first transistor and a second transistor, wherein drains of the first transistor and the second transistor are connected to an output terminal of the exposure control signal, and gates of the first transistor and the second transistor are connected to the control terminal of the unit bit static random access memory; and
   the signal processing device comprises: a third transistor, a fourth transistor, a fifth transistor, and a sixth transistor, wherein sources of the third transistor and the fourth transistor are connected to a first voltage source of the pixel circuit, a gate of the third transistor is separately connected to a gate of the fifth transistor, a drain of the fourth transistor, a drain of the sixth transistor, a source of the first transistor, and the first transmission transistor, a gate of the fourth transistor is separately connected to a gate of the sixth transistor, a drain of the third transistor, a drain of the fifth transistor, a source of the second transistor, and the second transmission transistor, and sources of the fifth transistor and the six transistors are grounded.

4. The pixel circuit according to claim 3, wherein the unit bit dynamic random access memory comprises:
   a seventh transistor, wherein a drain of the seventh transistor is connected to the output terminal of the exposure control signal, a gate of the seventh transistor is connected to a control terminal of the unit bit dynamic random access memory, and the seventh transistor is configured to receive the exposure control signal according to a control instruction of the control terminal;
   a first capacitor, wherein a first terminal of the first capacitor is separately connected to a source of the seventh transistor and the first transmission transistor, and a second terminal of the first capacitor is grounded; and
   an inverter, wherein a first terminal of the inverter is connected to a first terminal of the first capacitor, and a second terminal of the inverter is connected to the second transmission transistor.

5. The pixel circuit according to claim 1, further comprising:
   a read circuit, connected to the charge memory, wherein the read circuit is configured to read the charge in the charge memory, and output an exposure image.

6. The pixel circuit according to claim 5, wherein the charge memory comprises:
   a first charge memory, connected to the first transmission transistor, wherein the first charge memory is configured to output the charge according to a read instruction of the read circuit; and
   a second charge memory, connected to the second transmission transistor, wherein the second charge memory is configured to reset according to the read instruction of the read circuit.

7. The pixel circuit according to claim 6, wherein the first charge memory or the second charge memory comprises:
   a second capacitor, connected to the photoelectric conversion device; and
   a storage transistor, connected to the second capacitor and the read circuit, wherein the storage transistor is configured to transfer a charge in the second capacitor to the read circuit.

8. The pixel circuit according to claim 7, further comprising:
   a floating diffusion node between the storage transistor and the read circuit;
   a reset transistor, connected between a second voltage source and the floating diffusion node, wherein the reset transistor is configured to reset a voltage of the floating diffusion node according to a reset control signal;
   a source follower transistor, wherein a gate of the source follower transistor is connected to the floating diffusion node, and a drain of the source follower transistor is connected to the second voltage source; and
   a row selection transistor, wherein a drain of the row selection transistor is connected to a source of the source follower transistor, and a source and a gate of the row selection transistor are connected to the read circuit.

9. The pixel circuit according to claim 1, wherein the first transmission transistor and the second transmission transistor are alternately turned on.

10. An image sensor, comprising:
the pixel circuit according to claim 1.

11. A camera module, comprising:
a circuit board;
the image sensor according to claim 10, wherein the image sensor is electrically connected to the circuit board; and
a lens disposed on a side that is of the image sensor and that is away from the circuit board.

12. An electronic device, comprising:
the camera module according to claim 11.

* * * * *